(12) United States Patent
Feuerstack et al.

(10) Patent No.: US 9,035,612 B2
(45) Date of Patent: May 19, 2015

(54) METHOD FOR TRANSFERRING ENERGY BETWEEN AT LEAST TWO ENERGY STORAGE CELLS IN A CONTROLLABLE ENERGY STORE

(75) Inventors: Peter Feuerstack, Ludwigsburg (DE); Erik Weissenborn, Stuttgart (DE); Martin Kessler, Schwaebisch Gmuend (DE)

(73) Assignee: ROBERT BOSCH GMBH, Stuttgart (DE)

( * ) Notice: Subject to any disclaimer, the term of this patent is extended or adjusted under 35 U.S.C. 154(b) by 247 days.

(21) Appl. No.: 13/824,732

(22) PCT Filed: Aug. 31, 2011

(86) PCT No.: PCT/EP2011/064971
§ 371 (c)(1),
(2), (4) Date: May 29, 2013

(87) PCT Pub. No.: WO2012/038208
PCT Pub. Date: Mar. 29, 2012

(65) Prior Publication Data
US 2013/0234647 A1  Sep. 12, 2013

(30) Foreign Application Priority Data

Sep. 20, 2010 (DE) .......................... 10 2010 041 034

(51) Int. Cl.
*H02J 7/00* (2006.01)
*B60L 11/18* (2006.01)
(Continued)

(52) U.S. Cl.
CPC .............. *H02J 7/0054* (2013.01); *B60L 11/18* (2013.01); *B60L 11/1866* (2013.01);
(Continued)

(58) Field of Classification Search
CPC .............................. H02J 7/0014; H02J 7/1492
USPC .................... 320/103, 119, 122, 123
See application file for complete search history.

(56) References Cited

U.S. PATENT DOCUMENTS 6,586,909 B1 *  7/2003  Trepka ........................... 320/108
8,536,824 B2 *  9/2013  St-Jacques .................... 320/103
(Continued)

FOREIGN PATENT DOCUMENTS

| CN | 1222781 | 7/1999 |
|---|---|---|
| CN | 201207620 | 3/2009 |
| DE | 10 2010 027 857 | 4/2010 |
| DE | 10 2010 027 861 | 4/2010 |
| DE | 10 2008 043 593 | 5/2010 |
| JP | 2008-125158 | 5/2008 |

(Continued)

OTHER PUBLICATIONS

International Search Report for PCT/EP2011/064971, dated Aug. 13, 2012.

*Primary Examiner* — Richard Isla Rodas
*Assistant Examiner* — Nathaniel Pelton
(74) *Attorney, Agent, or Firm* — Kenyon & Kenyon LLP

(57) ABSTRACT

In a method for transferring energy between at least two energy storage cells in a controllable energy store that serves to control and to supply electrical energy to an n-phase electric machine, which energy store has n power supply arms which each have at least two series-connected energy storage modules which each include at least one electrical energy storage cell with an associated controllable coupling unit, and are connected to one respective phase of the electric machine, in a charging phase, all coupling units of those energy storage modules which are to be used as an energy source are controlled in such a way that the respectively associated energy storage cells are connected into the respective power supply arm.

3 Claims, 2 Drawing Sheets

(51) Int. Cl.
*H02P 27/14* (2006.01)
*H02J 7/14* (2006.01)

(52) U.S. Cl.
CPC ............ *H02J 7/0014* (2013.01); *H02J 7/0024* (2013.01); *H02J 7/1492* (2013.01); *H02J 2007/0059* (2013.01); *H02J 2007/0067* (2013.01); *H02P 27/14* (2013.01); *Y02T 10/642* (2013.01); *Y02T 10/7005* (2013.01); *Y02T 10/7055* (2013.01); *Y02T 10/7061* (2013.01); *Y02E 10/766* (2013.01); *B60L 11/1853* (2013.01); *B60L 11/1864* (2013.01)

(56) References Cited

U.S. PATENT DOCUMENTS

| | | | |
|---|---|---|---|
| 8,901,884 B2* | 12/2014 | Maleus | 320/116 |
| 2004/0135545 A1* | 7/2004 | Fowler et al. | 320/118 |
| 2004/0135546 A1* | 7/2004 | Chertok et al. | 320/118 |
| 2009/0171521 A1* | 7/2009 | Moki et al. | 701/22 |

FOREIGN PATENT DOCUMENTS

| | | |
|---|---|---|
| JP | 2009-11022 | 1/2009 |
| WO | WO 2007/109890 | 10/2007 |

\* cited by examiner

METHOD FOR TRANSFERRING ENERGY BETWEEN AT LEAST TWO ENERGY STORAGE CELLS IN A CONTROLLABLE ENERGY STORE

BACKGROUND OF THE INVENTION

1. Field of the Invention

The present invention relates to a method for transferring energy between at least two energy storage cells in a controllable energy store.

2. Description of the Related Art

It is becoming apparent that, in future, electronic systems that combine new energy storage technologies with electric drive technology will be increasingly used both in stationary applications, such as, for example, wind power installations, and in vehicles, such as hybrid or electric vehicles. In conventional applications, an electric machine which, for example, is in the form of a rotating-field machine is controlled by way of a converter in the form of an inverter. Characteristic of such systems is a so-called dc link via which an energy store, usually a battery, is connected to the dc voltage side of the inverter. In order to be able to meet the requirements in terms of output and power for a particular application, a plurality of battery cells are connected in series. Since the current provided by such an energy store has to flow through all the battery cells and since a battery cell is able to conduct only a limited current, battery cells are often additionally connected in parallel in order to increase the maximum current.

As well as providing a high total voltage, the series connection of a plurality of battery cells brings with it the problem that the entire energy store fails if a single battery cell fails, since battery current is then no longer able to flow. Such a failure of the energy store may lead to failure of the entire system. In the case of a vehicle, failure of the drive battery may lead to the vehicle being "stranded". In other applications, such as, for example, rotor blade adjustment in wind power installations, this may even give rise to hazardous situations under adverse general conditions, for example in a strong wind. For that reason, a constant objective is a high reliability of the energy store, "reliability" meaning the ability of a system to operate for a given time without any faults.

The German Patent Applications DE 10 2010 027857 and DE 10 2010 027861 describe batteries having a plurality of battery module strings that are directly connectable to an electric machine. The battery module strings have a plurality of battery modules connected in series, each battery module having at least one battery cell and an associated controllable coupling unit which allows the respective battery module string to be interrupted or allows the respectively associated at least one battery cell to be bridged or allows the respectively associated at least one battery cell to be connected into the respective battery module string, in dependence on control signals. By suitable actuation of the coupling units, for example with the aid of pulse width modulation, suitable phase signals may also be provided for controlling the electric machine, so that a separate pulse inverter may be dispensed with. The pulse inverter required for controlling the electric machine is therefore integrated, as it were, in the battery. For the purposes of disclosure, those two earlier Applications are also incorporated in their entirety in the present Application.

BRIEF SUMMARY OF THE INVENTION

The present invention provides a method for transferring energy between at least two energy storage cells in a controllable energy store serving to control and to supply electrical energy to an n-phase electric machine, where $n \geq 1$. The controllable energy store includes in this case n parallel power supply arms which each have at least two series-connected energy storage modules which each include at least one electrical energy storage cell with an associated controllable coupling unit. The power supply arms are connectable on one side to a reference potential—hereinafter referred to as a reference bus—and on the other side to one respective phase of the electric machine. In dependence on control signals, the coupling units either interrupt the respective power supply arm or bridge the respectively associated energy storage cells or connect the respectively associated energy storage cells into the respective power supply arm. In order to enable the transfer of energy from at least one of the energy storage cells to at least one other energy storage cell, in a charging phase all coupling units of those energy storage modules that are to be used as an energy source are controlled in such a way that the respectively associated energy storage cells are connected into the respective power supply arm. All coupling units that lie in the power supply arm of energy storage modules that are to be used as an energy source, but which themselves are associated with energy storage modules that are not to be used as an energy source are controlled in such a way that the respectively associated energy storage cells are bridged. All coupling units that lie in a power supply arm of energy storage cells that are to be charged are controlled in such a way that the respectively associated energy storage cells are bridged, and all remaining coupling units are controlled in such a way that the respective power supply arms are interrupted. In a freewheeling phase following the charging phase, all coupling units that are associated with energy storage cells that are to be charged are then controlled in such a way that the associated energy storage cells are connected into the respective power supply arm. All coupling units that lie in the power supply arm of energy storage cells that are to be charged, but which themselves are not associated with any energy storage cells that are to be charged are controlled in such a way that the respectively associated energy storage cells are bridged. All coupling units of those energy storage modules which are to be used as an energy source are controlled in such a way that the respectively associated energy storage cells are connected into the respective power supply arm or in such a way that the respectively associated energy storage cells are bridged. All coupling units that lie in the power supply arm of energy storage modules that are to be used as an energy source, but which themselves are associated with energy storage modules that are not to be used as an energy source are controlled in such a way that the respectively associated energy storage cells are bridged and all remaining coupling units are controlled in such a way that the respective power supply arms are interrupted.

The present invention is based on the basic idea of using on the one hand the coupling units and on the other hand the stator windings of the electric machine to use a balancing of the state of charge between individual energy storage modules, so that a desired charge distribution over the individual energy storage modules may be achieved. This is done by operating the coupling units and the stator windings in a charging phase analogously to a step-up converter, with energy being supplied to the stator windings from energy storage modules that are to serve as an energy source and being stored there and then, in a freewheeling phase, being given up to the energy storage cells that are to be charged. This involves no additional expenditure on hardware and therefore there are also no additional costs and no additional space is required.

Using the method according to the present invention, both the charging of energy storage cells of an individual energy storage module and the simultaneous charging of energy storage cells of a plurality of energy storage modules are possible. It is also possible for the energy storage cells of an individual energy storage module or the energy storage cells of a plurality of energy storage modules to be used as an energy source. In the case of a polyphase electric machine, the energy storage cells of energy storage modules lying in different power supply arms may also be used simultaneously as an energy source or may also be charged simultaneously.

In the case of concomitant use of the motor inductance of the electric machine it is necessary, however, to avoid the development of undesirable moments in the electric machine during the charging process. This may be achieved by mechanically blocking the electric machine during the charging process, for example with the aid of a transmission pawl. Alternatively, the rotor position of the electric machine may also be monitored, for example with the aid of an appropriate sensor system, and shutting-down may take place in the event of rotor movement being detected.

Further features and advantages of embodiments of the present invention will be apparent from the following description with reference to the accompanying drawings.

DETAILED DESCRIPTION OF THE INVENTION

Figure 1:
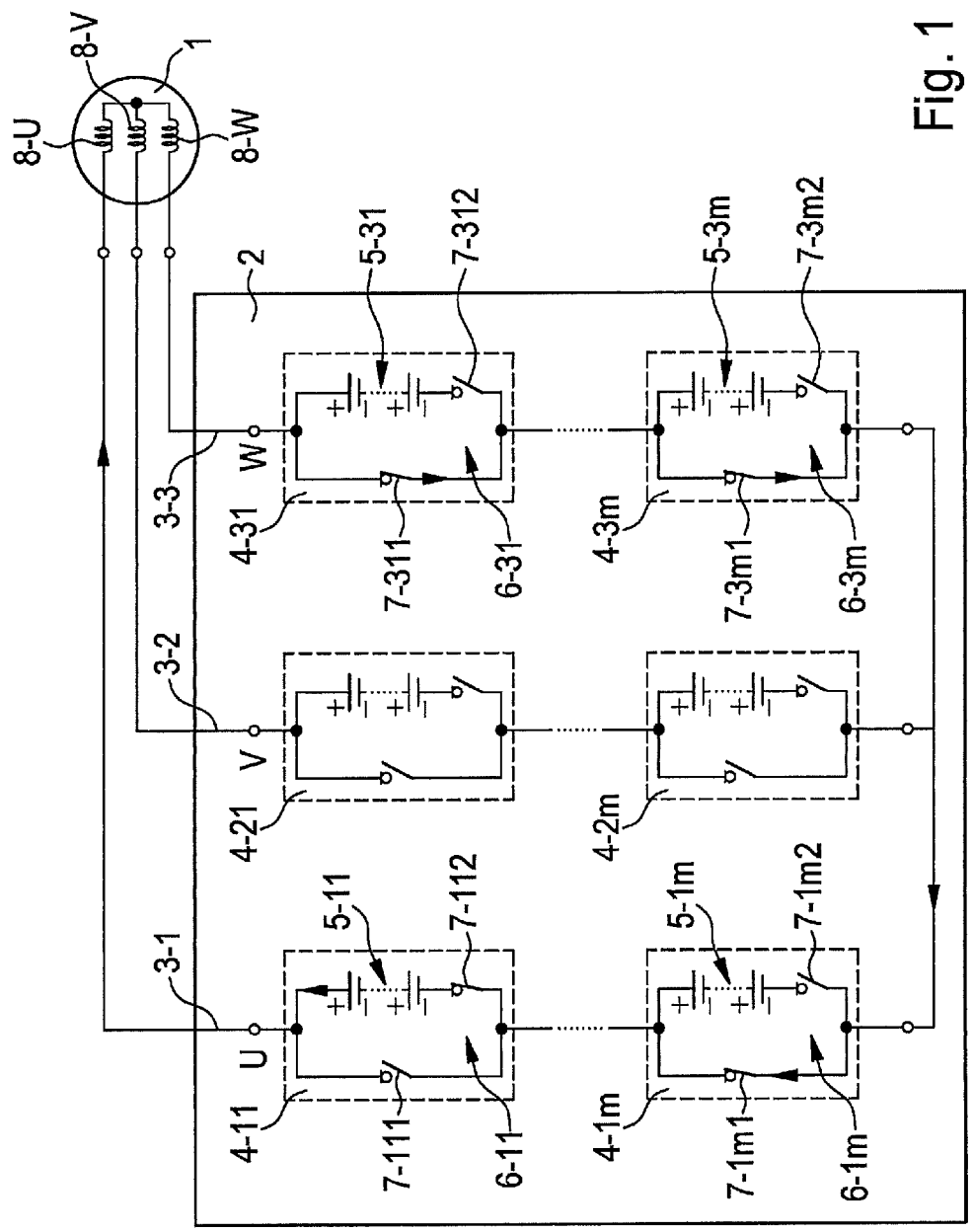
FIG. 1 is a schematic illustration of an electric machine with a controllable power supply in a charging phase.
Figure 2:
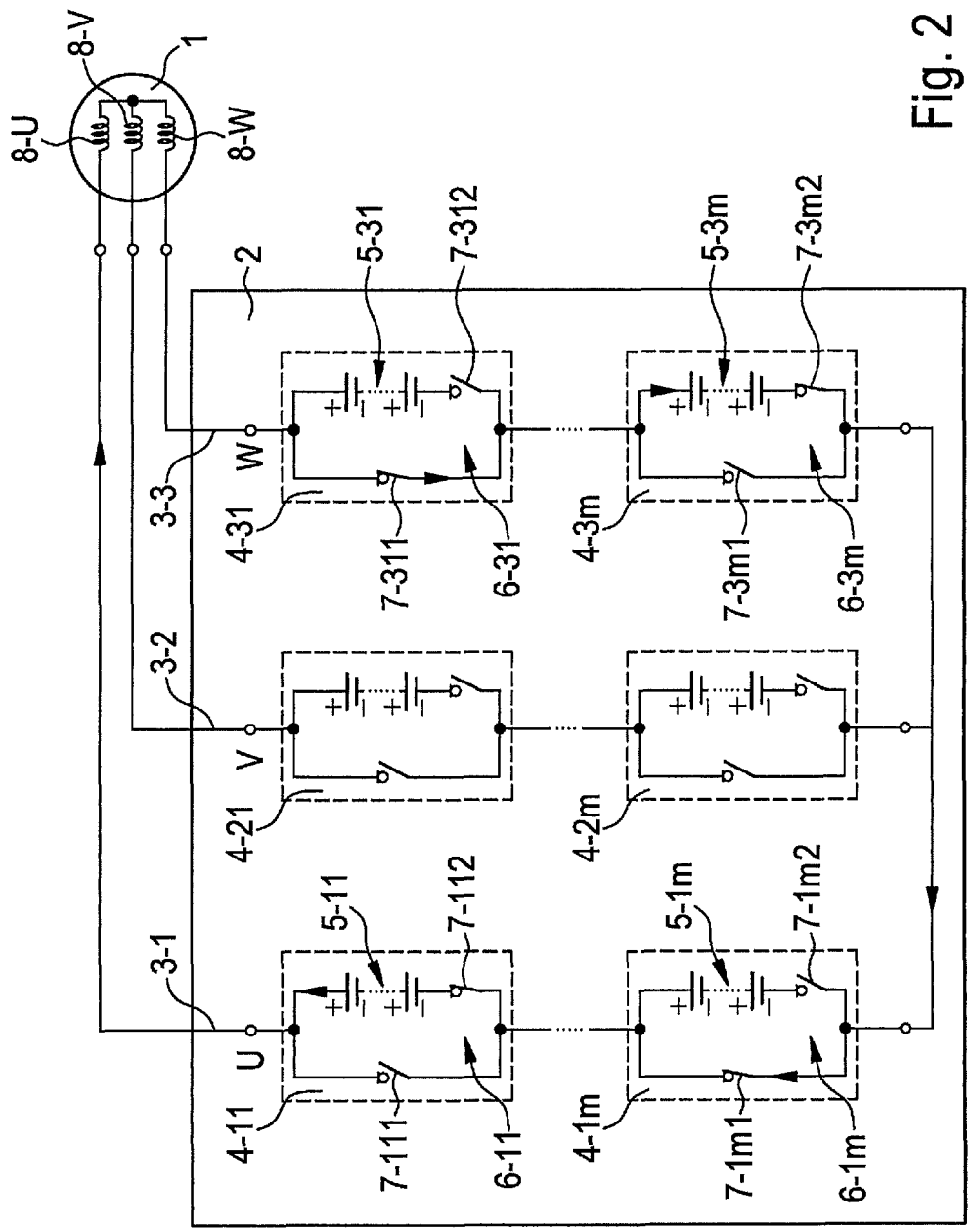
FIG. 2 is a schematic illustration of the electric machine with the controllable power supply of FIG. 1 in a freewheeling phase.

FIGS. 1 and 2 show a schematic illustration of a charging system according to the invention. A controllable energy store 2 is connected to a three-phase electric machine 1. Controllable energy store 2 includes three power supply arms 3-1, 3-2 and 3-3 which are connected on one side to a reference potential T-(reference bus), which carries a low potential in the embodiment illustrated, and on the other side are each connected to a respective individual phase U, V, W of electric machine 1. Each of power supply arms 3-1, 3-2 and 3-3 has m series-connected energy storage modules 4-11 through 4-1$m$, 4-21 through 4-2$m$ and 4-31 through 4-3$m$, respectively, where m≥2. Energy storage modules 4 each include in turn a plurality of series-connected electrical energy storage cells, which for clarity of the drawings are provided with reference characters 5-11 through 5-1$m$ and 5-31 through 5-3$m$ only in power supply arms 3-1 and 3-3, respectively, which are connected to phases U and W of electric machine 1. Energy storage modules 4 furthermore each include a coupling unit which is associated with energy storage cells 5 of respective energy storage module 4. For clarity of the drawings, the coupling units also are provided with reference characters 6-11 through 6-1$m$ and 6-31 through 6-3$m$ only in power supply arms 3-1 and 3-3, respectively. In the embodiment variant illustrated, coupling units 6 are each formed by two controllable switching elements 7-111 and 7-112 through 7-1$m$1 and 1-1$m$2 and, respectively, 7-311 and 7-312 through 7-3$m$1 and 7-3$m$2. The switching elements may be configured in this case as power semiconductor switches, for example in the form of IGBTs (insulated gate bipolar transistors) or as MOSFETs (metal oxide semiconductor field-effect transistors).

Coupling units 6 make it possible to interrupt the respective power supply arm 3 by opening both switching elements 7 of a coupling unit 6. Alternatively, by closing a respective one of switching elements 7 of a coupling unit 6, energy storage cells 5 may either be bridged, for example by closing switch 7-311, or be connected into the respective power supply arm 3, for example by closing switch 7-312.

The total output voltages of power supply arms 3-1 through 3-3 are determined by the particular switching state of controllable switching elements 7 of coupling units 6 and may be set in stages. The staging is obtained in dependence on the voltage of the individual energy storage modules 4. Assuming the preferred embodiment of energy storage modules 4 configured in the same way, a maximum possible total output voltage is given by the voltage of an individual energy storage module 4 times the number m of energy storage modules 4 connected in series per power supply arm.

Coupling units 6 thus allow phases U, V, W of electric machine 1 to be switched either to a high reference potential or to a low reference potential and to that extent may also fulfill the function of a known inverter. Power and operating mode of electric machine 1 may therefore be controlled by controllable energy store 2 with suitable actuation of coupling units 6. Controllable energy store 2 therefore fulfills to that extent a dual function since on the one hand it serves to supply electrical energy to electric machine 1 but on the other hand it serves to control electric machine 1.

Electric machine 1 has stator windings 8-U, 8-V and 8-W which are connected to one another in known manner in a Y-connection.

In the exemplary embodiment illustrated, electric machine 1 is configured as a three-phase rotary current machine, but may also have fewer or more than three phases. The number of phases of the electric machine also determines, of course, the number of power supply arms 3 in controllable energy store 2.

In the exemplary embodiment illustrated, each energy storage module 4 has a plurality of series-connected energy storage cells 5. Alternatively, energy storage modules 4 may, however, also have only a single energy storage cell each or may also have energy storage cells connected in parallel.

In the exemplary embodiment illustrated, coupling units 6 are each formed by two controllable switching elements 7. Coupling units 6 may, however, also be implemented by more or fewer controllable switching elements as long as it is possible to perform the necessary functions (interruption of the power supply arm, bridging of the energy storage cells and connection of the energy storage cells into the power supply arm). Examples of alternative configurations of a coupling unit are apparent from the German Applications DE 10 2010 027857 and DE 10 2010 027861. In addition, it is also conceivable, however, for the coupling units to have switching elements in a full bridge connection, which offers the additional possibility of a voltage reversal at the output of the energy storage module.

The charging process of energy storage cells 5 of an individual energy storage module 4, namely energy storage cells 5-31$m$ of energy storage module 4-3$m$ in power supply arm 3-3, is described by way of example below. In that case, only energy storage cells 5 of an individual energy storage module 4, namely energy storage cells 5-11 of energy storage module 4-11 in power supply arm 3-1, are to be used as an energy source.

During a charging phase, which is illustrated in FIG. 1, coupling unit 6-11 of energy storage module 4-11 which is to be used as an energy source is controlled by a control unit, not shown, in such a way that the respectively associated energy storage cells 5-11 are connected into power supply arm 3-1. That is achieved in practice by switching element 7-112 being closed whereas switching element 7-111 is opened. All remaining coupling units 6-12 through 6-1$m$ in power supply arm 3-1 are controlled in such a way that the respectively associated energy storage cells 5-12 through 5-1$m$ are bridged. That is achieved in practice by switching elements 7-121 through 7-1$m$1 being closed whereas switching elements 7-122 through 7-1$m$2 are opened. Coupling units 6-31 through 6-3$m$ of energy storage modules 4-31 through 4-3$m$, which lie in power supply arm 3-3 in which energy storage cells 5-3$m$ that are to be charged also lie, are controlled by a control unit, not shown, in such a way that the respectively associated energy storage cells 5-31 through 5-3$m$ are bridged. That is achieved in practice by switching elements 7-311 through 7-3$m$1 being closed whereas switching elements 7-312 through 7-3$m$2 are opened. All remaining coupling units, that is, all coupling units 6 in energy storage modules 4 of power supply arm 3-2, are controlled in such a way that power supply arm 3-2 is interrupted. That is achieved in practice by both switching elements 7 of coupling units 6 being opened in each case.

Actuation of coupling units 6 in such a manner causes current to flow through stator windings 8-U and 8-W, so that electrical energy is stored in stator windings 8-U and 8-W during the charging phase.

In a freewheeling phase following the charging phase, which is illustrated in FIG. 2, coupling unit 6-3$m$ which is associated with energy storage cells 5-3$m$ that are to be charged is controlled in such a way that the associated energy storage cells 5-3$m$ are connected into power supply arm 3-3. That is achieved in practice by switching element 7-3$m$2 being closed and switching element 7-3$m$1 being opened. All remaining coupling units 6-31 through 6-3($m$−1) that lie in power supply arm 3-3 of energy storage cells 5-3$m$ that are to be charged, but which themselves are not associated with any energy storage cells 5 that are to be charged are controlled in such a way that the respectively associated energy storage cells 5-31 through 5-3($m$−1) are bridged (closing of switching elements 7-311 through 7-3($m$−1)1 and opening of switching elements 7-312 through 7-3($m$−1)2). Coupling unit 6-11 of energy storage module 4-11, which is to be used as an energy source, may, as illustrated, be controlled in such a way that the associated energy storage cells 5-11 continue to be connected into power supply arm 3-1. This has the advantage that energy storage cells 5-11 directly contribute to the charging of energy storage cell 5-3$m$. As an alternative to this, coupling unit 6-11 of energy storage module 4-11 may, however, also be controlled in the freewheeling phase in such a way that the associated energy storage cells 5-11 are bridged. In that case, the charging of energy storage cell 5-3$m$ that is to be charged is carried out exclusively from the inductances of stator windings 8-U and 8-W. All remaining coupling units 6-12 through 6-1$m$ in power supply arm 3-1 of energy storage module 4-11 used as an energy source are controlled in such a way that the respectively associated energy storage cells 5-12 through 5-1$m$ are bridged. All remaining coupling units 6, that is, all coupling units 6 in energy storage modules 4 of power supply arm 3-2, are controlled in such a way that power supply arm 3-2 is interrupted.

Controlling coupling units 6 in such a manner produces an electrical connection of stator windings 8-U and 8-W to energy storage cells 5-3$m$ that are to be charged. The inductance of stator windings 8-U and 8-W drives the current further and in that manner charges energy storage cells 5-3$m$. If, as shown in FIG. 2, energy storage cells 5 serving as an energy source are also still connected into the respective power supply arm 3 in the freewheeling phase, they too directly contribute to the charging of energy storage cells 5 that are to be charged.

To avoid the production of undesirable moments in the electric machine during the transfer process, electric machine 1 may be mechanically blocked during the charging process, for example with the aid of a transmission pawl. Alternatively, the rotor position of electric machine 1 may also be monitored, for example with the aid of an appropriate sensor system, and shutting-down may take place in the event of rotor movement being detected.

What is claimed is:

1. A method for transferring energy between at least two energy storage cells in a controllable energy store which controls and supplies electrical energy to an n-phase electric machine, where n≥1, wherein the controllable energy store has n parallel power supply arms which (i) each have at least two series-connected energy storage modules which each include at least one electrical energy storage cell with an associated controllable coupling unit, (ii) are connected on one side to a reference bus, and (iii) are connected on a second side to one respective phase of the electric machine, and wherein, dependent on control signals, each coupling unit one of interrupts a respective power supply arm or bridge respectively associated energy storage cells or connect respectively associated energy storage cells into the respective power supply arm, the method comprising:

performing, in a charging phase, the following:
controlling all coupling units of energy storage modules which are to be used as an energy source, in such a way that the respectively associated energy storage cells are connected into the respective power supply arm;
controlling all coupling units which lie in the power supply arm of energy storage modules which are to be used as an energy source, but which coupling units are associated with energy storage modules which are not to be used as an energy source, in such a way that the respectively associated energy storage cells are bridged;
controlling all coupling units which lie in a power supply arm of energy storage cells which are to be charged, in such a way that the respectively associated energy storage cells are bridged; and
controlling all remaining coupling units in such a way that the respective power supply arms are interrupted;
performing, in a freewheeling phase following the charging phase, the following:
controlling all coupling units which are associated with energy storage cells which are to be charged, in such a way that the associated energy storage cells are connected into the respective power supply arm;
controlling all coupling units which lie in the power supply arm of energy storage cells which are to be charged, but which coupling unit are not associated with any energy storage cells which are to be charged, in such a way that the respectively associated energy storage cells are bridged;
controlling all coupling units of energy storage modules which are to be used as an energy source, in such a way that the respectively associated energy storage cells are one of connected into the respective power supply arm or bridged;
controlling all coupling units which lie in the power supply arm of energy storage modules which are to be used as an energy source, but which coupling units are associated with energy storage modules which are not to be used as an energy source, in such a way that the respectively associated energy storage cells are bridged; and controlling all remaining coupling units in such a way that the respective power supply arms are interrupted.

2. The method as recited in claim 1, wherein the electric machine is mechanically blocked during the energy transfer process.

3. The method as recited in claim 1, further comprising:
monitoring a rotor position of the electric machine; and
shutting down the electric machine in the event rotor movement is detected.

\* \* \* \* \*